INVENTORS
MORRIS KRAKINOWSKI
SILVIO U. BLASKOVIC
BY Ronald J. Kransdorf
ATTORNEY United States Patent Office 3,350,518

Patented Oct. 31, 1967

3,350,518

READER FOR PUNCHED RECORD

Morris Krakinowski, Ossining, and Silvio U. Blaskovic, Yorktown Heights, N.Y., assignors to International Business Machines Corporation, Armonk, N.Y., a corporation of New York Filed Feb. 11, 1966, Ser. No. 526,902
11 Claims. (Cl. 200—46)

ABSTRACT OF THE DISCLOSURE

A punched record reader is a statically operated fluid pressure device which includes an elastic diaphragm having a pattern of projections on its underside, there being one such projection for each possible punch index position of the record which is supported over a grille and under the diaphragm. Fluid pressure is applied to the diaphragm, forcing the projections against the record and, wherever punched openings are found in the record, the corresponding projections are forced through the openings into contact with underlying discrete pressure sensitive transducers such as small elastic diaphragm electrical switches.

This invention relates to punched record reading devices and more particularly to statically operated punched record reading devices.

Punched records such as cards and tapes are frequently used to store data in various data processing applications. In order to apply the information on these records to a data processing machine or computer or to convert the information on the records into humanly readable form, a punched record reader is required. These readers are of two general types. The first are dynamic readers which utilize brushes to sense the openings in a moving record. The speed at which these readers can operate is limited by the speed at which the record may be moved and, since these readers can read only a single row or a single column at a time, buffer storage devices must be provided to assemble information which require more than one column to store. Static, punched-record readers permit the actual reading of a single record to be performed much more rapidly and, since the entire record is read in parallel, the need for buffer storage devices is eliminated. Existing static, punched-record readers generally consist of a bank of spring-loaded pins which are pressed against the record being read. The pins which are adjacent to holes in the record pass therethrough to make contact with some sort of sensing element, while the pins which are not adjacent to holes in the record are supported in a raised position by the record. Since the record is supporting the pin against spring tension, a considerably greater force is exerted against the record by the raised pins than the force required to activate the pin sensing device. This force combined with the non-resilient nature of the metal pins employed, and the edge cutting effect of poorly alined pins, tends to deform the record slightly each time it is sensed, and substantially reduces the useful life of the record.

Another disadvantage of the pin sensing devices is that they are fairly complex and therefore expensive to build. The pins also need adjustment and lubrication, and are subject to wear making the device fairly expensive to operate and maintain. The pin is generally employed as one terminal of a contact and, since the contacts are therefore exposed, they are subject to contamination and cannot be employed in highly contaminated environments. Even in normal environments, dirt and paper dust from the cards ultimately cause contamination problems. The pin readers are also fairly bulky and, while capable of reading a record faster than dynamic readers, they require fairly extensive mechanical movements which limit their speed of operation. The speed of operation of the pin readers is also limited by the mass and inertia of the elements employed. The size of the pins, springs, and other related hardware limits the density of the pin array and therefore the hole density of the record which may be read. From the above, it is seen that, while pin readers are extremely useful devices, they do suffer from a number of serious limitations.

It is therefore a primary object of this invention to provide an improved static punched record reader.

A more specific object of this invention is to provide a static punched record reader which does not cause appreciable wear on the record being sensed.

Another object of this invention is to provide a punched record reader which requires neither adjustment nor lubrication and is therefore inexpensive to maintain.

Still another object of this invention is to provide a static punched record reader which is extremely simple and inexpensive to build and operate.

A further object of this invention is to provide a static punched record reader which is smaller and, having smaller strokes and less mass and inertia, is faster than existing readers.

Another object of this invention is to provide a punched record reader which is not subject to contamination and is therefore capable of operating in contaminated environments.

A still further object of this invention is to provide a static punched record reader which is capable of sensing high density records.

In accordance with these objects this invention provides a reader for a punched record which reader includes an elastic diaphragm having a pattern of projection on one side. There is a projection on the diaphragm for each index position of the record, and the record is supported in a manner such that each projection is adjacent to the corresponding index position. Fluid pressure is then applied to the diaphragm forcing the projections against the record. Projections which are adjacent to openings in the record are forced through the openings into contact with a pressure sensitive transducer or similar detecting device.

It is therefore a feature of this invention to use an elastic diaphragm having elastic projections on its under side to sense openings in a punched record.

Another feature of this invention is to use fluid pressure to force the projections on the diaphragm against the record whereby the same pressure is applied to unpunched positions of the record as is applied to the pressure sensitive transducer or other sensing device.

The foregoing objects, features and advantages of the invention will be apparent from the following more particular description of preferred embodiments of the invention, as illustrated in the accompanying drawings.

Figure 1:
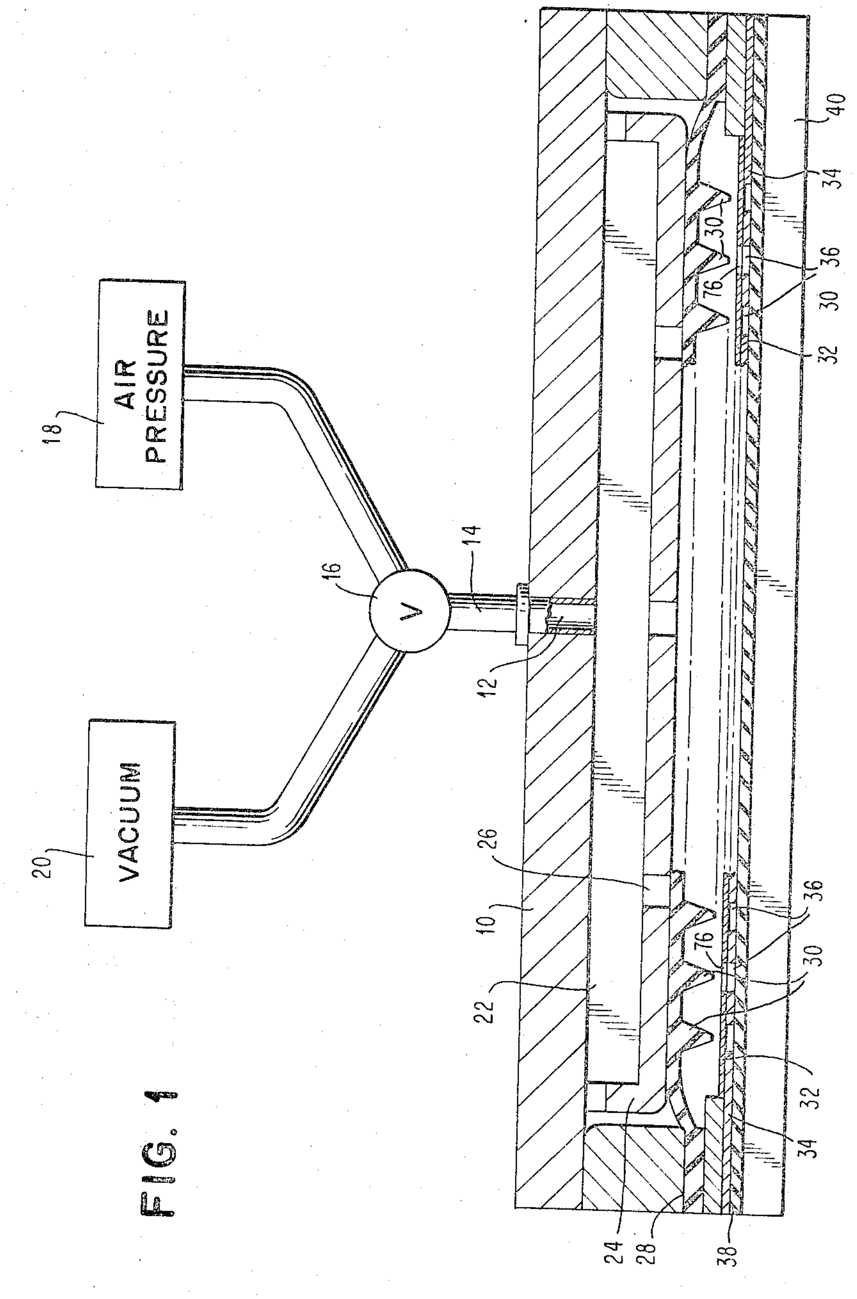
FIG. 1 is a cut-away view of a pneumatic embodiment of the punched record reader of this invention in its non-activated position.

Referring now to FIG. 1, it is seen that the punched record reader shown therein includes an upper plate 10 having a channel 12 formed therein. The channel 12 is connected through an air-tight tube 14 to electrically-controlled valve 16. When valve 16 is in one position, it leads to source of air pressure 18 and when the valve is in its other position, it leas to source of vacuum 20. Channel 12 terminates in an air chamber 22, the lower surface and sides of which are formed by bumper plate 24. Bumper plate 24 has openings 26 formed therein which permit the air or vacuum pressure in chamber 22 to be applied to the upper surface of elastic diaphragm 28. Diaphragm 28 has conical projections 30 formed on its under side. Diaphragm 28 and projections 30 may be formed of rubber or of any other suitable elastomeric material. The record 32 which is to be read is supported on grille 34 having openings 36 formed therein. Each projection 30 on diaphragm 28 is alined with an index position on record 32 and an opening 36 in grille 34. Punched record 32 may, for example, be a punched card or a punched tape. A bank of pressure sensitive transducers 38, one for each of the projections 30, are positioned under grille 34. The bottom layer of the punched-record reader is base plate 40.

Figure 3:
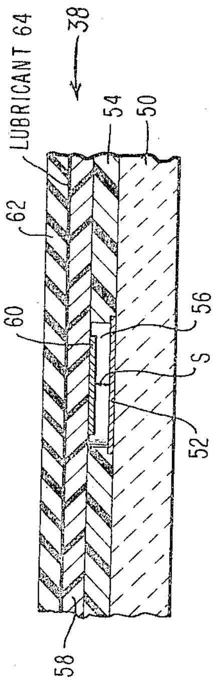
FIG. 3 is a cut-away view of a diaphragm switch suitable for use as a detecting element in the embodiment of the invention shown in either FIG. 1 or FIG. 2.

While pressure sensitive transducers 38 may be of any suitable type, switches having a small switching stroke (i.e., .005 to .010 inch) should be employed. Elastic diaphragm switches of the type shown in copending application Serial No. 442,758, now U.S. Patent 3,308,253, issued March 7, 1967 entitled "Diaphragm Switch Having a Diaphragm Supported on an Incompressible Layer and an Elastomer Overlaying the Diaphragm," filed March 25, 1965, on behalf of M. Krakinowski and assigned to the assignee of the instant application are employed in the preferred embodiment of the invention. FIG. 3 is a cut-away view of one such switch. From this figure it is seen that these switches include a base substrate 50 having a segment of conducting material 52 deposited thereon. Substrate 50 is separated from an elastic diaphragm 58, by an insulating layer 54 having an opening 56 therein. Diaphragm 58 has a conducting segment 60 attached to its underside which segment is adjacent to conducting segment 52 on substrate 50 but is normally separated therefrom by a space S. Diaphragm 58 is protected by a layer of elastomeric material 62 which forms the final layer of the switch. Since relative movement is required between layer 62 and diaphragm 58, a lubricant 64 may be provided there between. The switch shown in FIG. 3 is operated by applying pressure to layer 62 at a point above conducting segment 60 causing layer 62 and diaphragm 58 to be deformed to bring segment 60 into contact with segment 52 thereby completing a circuit. Where a bank of diaphragm switches 38 (FIG. 1) are employed, the switch of FIG. 3 is modified by, for example, coating the entire underside of diaphragm 58 with conducting material and applying a predetermined potential to this conducting plane. A contact closure is recognized by detecting the potential applied to the common conducting surface on an output line leading from a given conducting segment 52.

Figure 2:
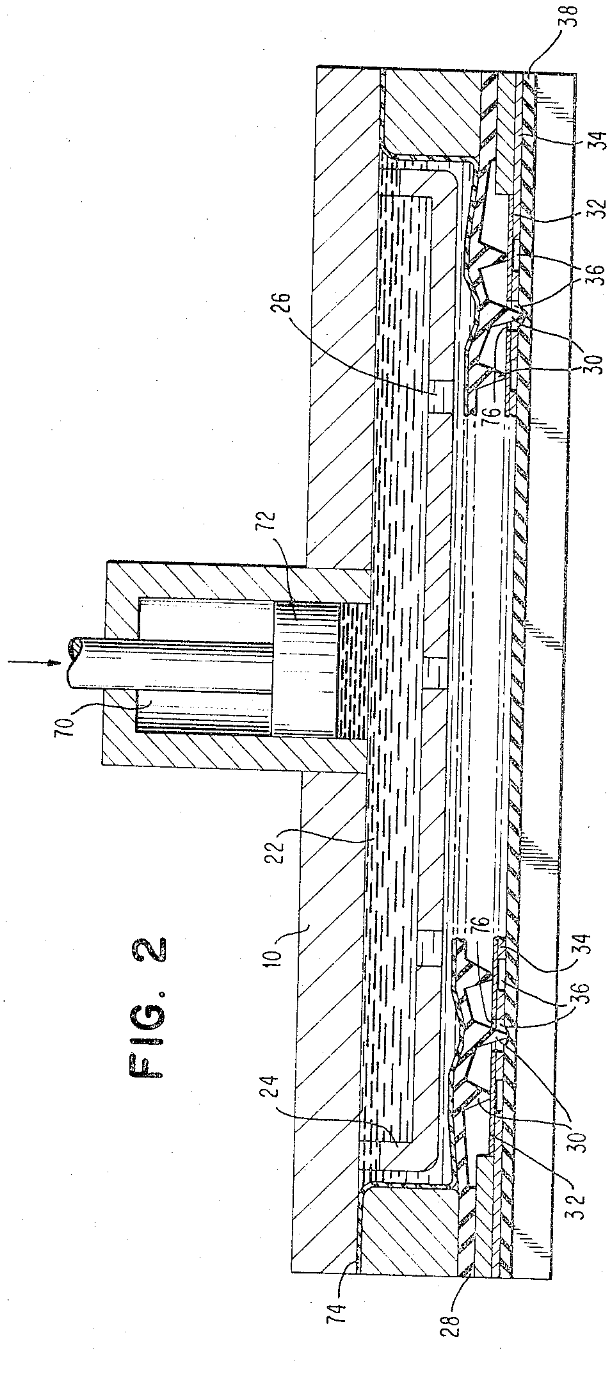
FIG. 2 is a cut-away view of a hydraulic embodiment of the invention in its activated position.

Referring now to FIG. 2, it is seen that the hydraulic embodiment of the invention is identical to the pneumatic embodiment except that a pump 70 having a reciprocating piston 72 has been substituted for elements 12–20 of FIG. 1 for applying fluid pressure to fluid chamber 22 and an elastic liner membrane 74 has been added between buffer plate 24 and diaphragm 28 to prevent liquid leakage. Oil, water, or any other suitable liquid may be employed in fluid chamber 22.

OPERATION

In operation, record 32 is initially positioned on supporting grille 34 either manually or by any suitable document feed device. Where a tape is being read, an incremental feed mechanism may be provided to feed successive segments of the tape into the reading device. Once the record has been properly positioned, fluid pressure is applied to the upper surface of diaphragm 28 either by applying an electrical impulse to valve 16 (FIG. 1) to switch it into a position connecting air pressure source 18 to fluid chamber 22 or by moving piston 72 (FIG. 2) to its lower position. Referring to FIG. 2, it is seen that when fluid pressure is applied to the upper surface of diaphragm 28, the projections 30 which are over openings 76 in record 32 are forced through the openings and the adjacent openings 36 in support grille 34 to apply pressure to the upper surface of the corresponding pressure transducer 38. The pressure on the upper surface of pressure transducer 38 causes diaphragm 58 (FIG. 3) to be deformed to bring conducting surface 60 into contact with conducting segment 52, thereby completing an electrical circuit which may be used to indicate the detection of an opening in the record.

When the record has been read, diaphragm 28 is permitted to return to its normal position (FIG. 1) by either switching valve 16 to its vacuum position, or by raising piston 72 (FIG. 2). The pneumatic embodiment of the invention shown in FIG. 1 is capable of slightly faster operation in that the vacuum applied to the upper surface of diaphragm 28 when valve 16 is switched to connect source 20 to chamber 22 effects a positive return of the diaphragm to its normal position rather than merely relying on the elasticity of the diaphragm itself to perform this function, as is the case in the hydraulic embodiment. Bumper plate 24 serves to limit the return movement of diaphragm 28. A total excursion of, for example, one-sixteenth inch, may be provided. If the bumper plate is eliminated, permitting more extensive movement of the diaphragm, the diaphragm may be stretched beyond its elastic limit and be torn. If a source of vacuum is not available, or the additional speed provided by a vacuum return is not required, valve 16 may permit chamber 22 to be vented to atmosphere, rather than connecting it to a source of vacuum, when it is desired to return diaphragm 28 to its normal position.

While in the above description it has been assumed that a parallel output is desired, a high speed serial output may be obtained from the reader of this invention by feeding the outputs from switches 38 through a high speed commutator.

One advantage of the punched record reader shown in FIGS. 1 and 2, is that the same pressure is applied to a projection 30 which is supported on an unpunched index position of the record as is applied to a projection which is activating a transducer 38. Since a pressure of only 10 to 15 p.s.i. is required to activate the diaphragm switch, a very slight pressure is applied to the record. Deformation of the record is further reduced by the fact that the projections 30, being elastic, tend to distort and distribute the load applied to the record over a larger area. There are therefore no hard, sharp edges to mar the record.

The projections 30 on the underside of diaphragm 28 are molded in a single operation and the entire assembly is therefore much cheaper to manufacture than to make 960 pins with corresponding springs, supports, guides, etc. The projections are also very small and may therefore be positioned closely together, permitting the reading of high density records. Since the only moving parts in the reader are elastic diaphragms, there is nothing to adjust or lubricate and maintenance costs are therefore nil. The small excursions of the projections 30 (15–20 mils), and the small mass and inertia of the entire assembly, permits extremely rapid operation. Since the operation may be controlled merely by applying a single pulse to an electrically controlled valve, the operation is simple and may easily be automated. Other advantages of the punched record reader of this invention are that the entire assembly may be less than an inch thick, permitting an extremely compact unit to be provided and, since the diaphragm switches 38 may easily be encapsulated, the contacts thereof are not subject to contamination and the reader may therefore be used in any desired atmosphere.

It is apparent that while air, or a liquid suc has water or oil, have been suggested as the media for applying pressure to the diaphragm 28, any suitable fluids could be used for this purpose. Similarly, while an elastic diaphragm switch of the type shown in FIG. 3, is the preferred form of pressure sensitive transducer, any suitable pressure sensitive transducer could be used as the transducers 38. The manner of controlling the application and removal of pressure to chamber 22 may similarly be varied.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A reader for a record having a pattern of index positions each of which may or may not be punched comprising:

a punched record having a pattern of punch index positions;

an elastic diaphragm having a pattern of projections on one side which pattern is the same as that of said index positions;

means for supporting said record with each of its index positions adjacent to the corresponding projection;

means for holding said diaphragm adjacent said record with said projections poised over corresponding record index positions;

means for applying pressure to said diaphragm to displace it and to force said projections against said record;

and means responsive to a projection passing through a punched index position in said record for detecting the punched index position.

2. A reader of the type described in claim 1 wherein the pressure applied to said diaphragm is fluid pressure.

3. A reader of the type described in claim 1 wherein said projections are formed on said diaphragm and are an integral part thereof.

4. A reader of the type described in claim 1 wherein said detecting means includes a pressure sensitive transducer corresponding to each index position of said record with each transducer being positioned to be touched by the corresponding projection when it passes through a punched index position.

5. A reader of the type described in claim 4 wherein said pressure sensitive transducers are elastic diaphragm switches.

6. A reader of the type described in claim 2 wherein said fluid pressure is hydraulic.

7. A reader of the type described in claim 2 wherein said fluid pressure is pneumatic.

8. A reader of the type described in claim 7 including means for applying vacuum to said diaphragm to positively restore it when said pneumatic pressure is removed.

9. A reader of the type described in claim 6 including means for preventing the leakage of hydraulic fluid.

10. A reader of the type described in claim 2 including a bumper for limiting the movement of said diaphragm when fluid pressure is removed from it.

11. A reader of the type described in claim 1 wherein said record supporting means is a grille having an opening corresponding to each index position of said record.

References Cited

UNITED STATES PATENTS

| | | | |
|---|---|---|---|
| 2,645,248 | 7/1953 | Baker | 200—83 |
| 3,237,646 | 3/1966 | Houser | 200—83 |
| 3,283,096 | 11/1966 | Horton | 200—86 |

BERNARD A. GILHEANY, *Primary Examiner.*

H. BROOME, *Assistant Examiner.*